United States Patent
Shiba et al.

(10) Patent No.: US 11,072,721 B2
(45) Date of Patent: Jul. 27, 2021

(54) INK JET PRINTING METHOD

(71) Applicant: CANON KABUSHIKI KAISHA, Tokyo (JP)

(72) Inventors: Tetsufumi Shiba, Kawasaki (JP); Kenichi Iida, Kawasaki (JP); Kazuhiko Araki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 404 days.

(21) Appl. No.: 16/159,299

(22) Filed: Oct. 12, 2018

(65) Prior Publication Data
US 2019/0127600 A1    May 2, 2019

(30) Foreign Application Priority Data

Oct. 31, 2017 (JP) .................... 2017-210532
Sep. 18, 2018 (JP) .................... 2018-173268

(51) Int. Cl.
| | |
|---|---|
| C09D 11/40 | (2014.01) |
| B41M 1/22 | (2006.01) |
| B41J 2/01 | (2006.01) |
| C09D 11/328 | (2014.01) |
| C09D 11/322 | (2014.01) |
| B41M 5/00 | (2006.01) |

(52) U.S. Cl.
CPC ............... C09D 11/40 (2013.01); B41J 2/01 (2013.01); B41M 1/22 (2013.01); B41M 5/0023 (2013.01); C09D 11/322 (2013.01); C09D 11/328 (2013.01)

(58) Field of Classification Search
None
See application file for complete search history.

(56) References Cited

U.S. PATENT DOCUMENTS

| 9,944,107 | B2 * | 4/2018 | Tanaka ................. B41M 5/52 |
| 10,596,831 | B2 * | 3/2020 | Iida ..................... B41M 3/008 |
| 2004/0246321 | A1 * | 12/2004 | Takashima ............. C09D 11/40 347/100 |
| 2008/0113195 | A1 | 5/2008 | Boll |
| 2010/0009136 | A1 | 1/2010 | Oyanagi |
| 2012/0249668 | A1 * | 10/2012 | Denda .................. B41M 5/0023 347/20 |
| 2013/0057616 | A1 * | 3/2013 | Hirata .................. B41M 5/0023 347/40 |
| 2013/0084440 | A1 * | 4/2013 | Kasperchik ............. B44C 5/02 428/206 |
| 2015/0072089 | A1 * | 3/2015 | Wang ................... B41M 5/0023 428/32.19 |
| 2015/0132509 | A1 * | 5/2015 | Wang ..................... B41M 5/508 428/32.19 |
| 2015/0165807 | A1 * | 6/2015 | Zhou ...................... B41M 5/506 428/195.1 |
| 2015/0273885 | A1 | 10/2015 | Imai |
| 2018/0333970 | A1 * | 11/2018 | Iida ........................ B41J 2/2114 |
| 2018/0362790 | A1 * | 12/2018 | Watanabe ................ C08K 3/08 |
| 2020/0101757 | A1 * | 4/2020 | Tanaka ................. C09D 11/322 |

FOREIGN PATENT DOCUMENTS

| JP | 2004-285106 A | 10/2004 |
| JP | 2010-18651 A | 1/2010 |
| JP | 2015-193127 A | 11/2015 |
| JP | 2016-14141 A | 1/2016 |
| JP | 2016-108545 A | 6/2016 |
| WO | 2008/049519 A | 5/2008 |

* cited by examiner

Primary Examiner — Helene Klemanski
(74) Attorney, Agent, or Firm — Canon U.S.A., Inc. IP Division

(57) ABSTRACT

An ink jet printing method includes printing an image on a printing medium including a transparent substrate and an ink-receiving layer on one side of the transparent substrate by applying a first ink and a second ink onto the surface of the ink-receiving layer of the printing medium in such a manner that the first ink and the second ink are at least partially superposed one on the other. The first ink is an aqueous ink containing silver particles, and the second ink is an aqueous ink containing a dye. The particle size at 50% in the cumulative volume distribution of the silver particles is larger than the average pore size of the ink-receiving layer.

20 Claims, No Drawings

INK JET PRINTING METHOD

BACKGROUND

Field of the Disclosure

The present disclosure relates to an ink printing method.

Description of the Related Art

Taking advantage of some features of metallic particles, inks containing metallic particles have been used to produce electrical circuits and are, in addition, being used in Christmas cards and other greeting cards to give a metallic feel to the cards. To give a metallic feel, inks are required to be able to print decorative and metallic color imagery (hereinafter referred to as metallic color imagery or a metallic color image), but not required to be electrically conductive, unlike for use for electrical circuits. Japanese Patent Laid-Open No. 2016-14141 discloses an ink set for use to print metallic color imagery, and the ink set includes an oil-based ink containing flaky (flat) aluminum particles and an oil-based ink containing a dye. Japanese Patent Laid-Open No. 2015-193127 discloses an ink jet recording (printing) method in which an aqueous ink containing a dye and an aqueous ink containing silver particles are ejected in this order onto a region of matte paper to which a treatment agent containing inorganic particles has been applied.

Use of an oil-based ink as disclosed in Japanese Patent Laid-Open No, 2016-14141 is accompanied by a measure against odor of the organic solvent evaporated from the ink. Accordingly, some of the following embodiments provide an ink jet printing method using not oil-based inks but aqueous inks. In a printing method for reducing degradation of imagery printed on printing media, unlike the method disclosed in Japanese Patent Laid-Open No. 2015-193127, imagery is printed on not matte paper but a printing medium including a transparent substrate, and the imagery is observed from the side opposite the print side of the medium. In this case as well, metallic color imagery is often printed. When an aqueous ink containing silver particles and an aqueous ink containing a dye are applied onto a printing medium including a transparent substrate and observed from the side opposite the side onto which the inks had been applied, the images had a high chroma, but some of the images were not satisfactorily glossy.

SUMMARY

Accordingly, the present disclosure provides an ink jet printing method enabling glossy images having a high chroma to be printed.

According to an aspect of the disclosure, there is provided an ink t printing method including printing an image on a printing medium including a transparent substrate and an ink-receiving layer on one side of the transparent substrate by applying a first ink and a second ink onto the surface of the ink-receiving layer of the printing medium in such a manner that the first ink and the second ink are at least partially superposed one on the other. The first ink is an aqueous ink containing silver particles, and the second ink is an aqueous ink containing a dye. The particle size at 50% in the cumulative volume distribution of the silver particles is larger than the average pore size of the ink-receiving layer.

The ink jet printing method disclosed herein enables glossy images having a high chroma to be printed.

Further features of various embodiments will become apparent from the following description of exemplary embodiments.

DESCRIPTION OF THE EMBODIMENTS

Exemplary embodiments of the present disclosure will now be described in detail. In the following description, the aqueous ink used in the embodiments may be simply referred to as the ink. Physical properties mentioned herein are those at a temperature of 25° C. unless otherwise specified. The gloss and the chromaticity of an image mentioned herein are properties of the image viewed from the side of the printing medium opposite the ink-receiving layer. Also, an image having a high chroma refers to an image that seems not to be silver but to be colored with the dye used.

When some images were printed on a printing medium with an aqueous ink containing the flaky aluminum particles (disclosed in Japanese Patent Laid-Open No. 2016-14141) and an aqueous ink containing a dye, the printed images were not glossy. An investigation found that the metallic coating of an ink containing the aluminum particles (disclosed in Japanese Patent Laid-Open No. 2016-14141) formed on the printing medium had many gaps. Accordingly, some embodiments substitute an ink containing silver particles for the ink containing aluminum particles. As a result, glossy images were able to be printed. Also, in some embodiments, in order to enhance the gloss of the images, it is important that the particle size at 50% in the cumulative volume distribution of the silver particles is larger than the pore size of the ink-receiving layer. The reason for this is as follows.

The particles used in ink jet aqueous inks generally have a particle size of several nanometers to several tens of nanometers in view of ejection stability. The melting point of metal particles depends on what the metal is and the particle size. For silver particles constituted of elemental silver (silver atoms), the smaller the particle size, the lower the melting point. In the case of small silver particles, the proportion of the number of silver atoms at the surface of a particle to the total number of silver atoms of the particle is higher than in the case of large silver particles. Silver atoms at the surfaces of silver particles are more movable than internal silver atoms bound to each other by metallic bonds formed by neighboring silver atoms. Silver atoms at the surfaces of silver particles are therefore likely to form metallic bonds with silver atoms at the surfaces of the neighboring silver particles and thus fuse with each other. Small silver particles are likely to fuse with neighboring silver particles. Thus, silver particles can form a silver smooth coating having few gaps on a printing medium, thus imparting a gloss to the printed image.

Unlike silver particles, aluminum particles are less likely to fuse. When an image is printed with an ink containing aluminum particles, therefore, the aluminum particles do not fuse with each other, forming a metallic coating having many gaps. Consequently, the amount of light reflected in a certain direction is reduced, and the printed image is not glossy.

Thus, inks containing silver particles can fuse with each other to form a silver coating not having gaps on the printing medium, thus imparting a gloss to images. However, when a first ink containing silver particles was applied onto the surface of an ink-receiving layer of a printing medium including a transparent substrate and an ink-receiving layer disposed on one side of the transparent substrate, the gloss of the resulting image was not good in some cases. The reason for insufficient gloss may be that silver particles are trapped in the pores in the ink-receiving layer and become difficult to come close to and fuse with each other.

Accordingly, from the viewpoint of enhancing the gloss of printed imagery, to stop silver particles from being easily trapped in the pores of the ink-receiving layer, in some embodiments the particles size at 50% in the cumulative volume distribution of the silver particles is larger than the average pore size of the ink-receiving layer. In the following description, the particle size at 50% in the cumulative volume distribution of the silver particles may be simply referred to as the $D_{50}$ particle size of silver particles, and the average pore size of the ink-receiving layer may be simply referred to as the pore size of the ink-receiving layer. The particle size of silver particles may be determined by dynamic light scattering. The pore size of the ink-receiving layer may be determined with a pore size distribution measuring apparatus using gas permeation.

The particle size at 50% in the cumulative distribution ($D_{50}$ particle size) refers to the diameter of particles at a point in the cumulative particle size curve at which the cumulative volume calculated from the smallest particle in ascending order comes to 50% of the total volume of the particles subjected to measurement. The pore size of the ink-receiving layer is a diameter of the pores. A correlation between the $D_{50}$ particle size of silver particles and the average pore size of the ink-receiving layer was found.

Silver particles having a $D_{50}$ particle size larger than the pore size of the ink-receiving layer are not likely to be trapped in the pores in the ink-receiving layer. Accordingly, these silver particles can fuse with neighboring silver particles to form a silver coating with less gaps on the printing medium, thus imparting a gloss to the printed image.

In order to print imagery having a high chroma, a second ink containing a dye, as well as the first ink containing silver particles, is applied so as to be at least partially superposed one on the other. On applying the ink containing a dye, the dye penetrates the ink-receiving layer together with the liquid component of the ink. Since the dye, which is transparent, does not hide the gloss of the silver coating formed on the ink-receiving layer even though the dye is present on the ink-receiving layer, both of a gloss and a high chroma can be imparted to the image.

In contrast, inks containing a pigment as a coloring material, but not containing a dye, do not contribute to printing glossy imagery having a high chroma. If an ink containing silver particles is applied after applying an ink containing a pigment, the non-transparent pigment hides the gloss of the silver coating formed on the ink-receiving layer. Therefore, glossy imagery is not obtained. If the ink containing a pigment is applied after applying the ink containing silver particles, the pigment is deposited on the silver coating. Therefore, the printed image observed from the side opposite the ink-receiving layer seems to be silver without having a high chroma.

Ink Jet Printing Method

The ink jet printing method of the present disclosure includes printing an image on a printing medium including a transparent substrate and the above-described ink-receiving layer disposed on one side of the transparent substrate by applying the first ink and the second ink onto the surface of the ink-receiving layer of the printing medium in such a manner that the first ink and the second ink are at least partially superposed one on the other.

In some embodiments, the inks may be ejected from an ink jet printing head to print the image. For ejecting an ink, a mechanical energy or a thermal energy may be applied to the ink. In some embodiments, a thermal energy may be applied to the inks.

After the first ink containing silver particles is applied, the second ink containing a dye may be applied so as to cover at least a portion of the region coated with the first ink. Alternatively, after the second ink containing a dye is applied, the first ink containing silver particles may be applied so as to cover at least a portion of the region coated with the second ink. Glossy images having a high chroma can be obtained in either case. In some embodiments, the first ink may be applied after the application of the second ink so as to cover at least a portion of the region coated with the second ink.

In some embodiments of the ink jet printing method of the present disclosure, any liquid other than the first ink and the second ink is not applied before the first ink and the second ink are applied onto to the printing medium. If a liquid is applied before the first ink and the second ink are applied, the total amount of liquid to be applied onto the printing medium is increased compared to the case where no liquid is applied before the first and the second ink are applied, and bleeding in the printed image may not be satisfactorily reduced. In some embodiments, the first step of the ink jet printing method may be applying the first ink and the second ink.

First Ink

The first ink is an aqueous ink containing silver particles. Constituents of the first ink will now be described.

Silver Particles

A silver particle contains silver atoms. Although the silver particle may further contain other atoms such as oxygen atoms, sulfur atoms, and/or carbon atoms, it is beneficial that silver atoms account for 50.0% or more of the total mass of the silver particle.

The silver particles may be produced, for example, by a pulverization process in which a silver ingot is pulverized with a pulverizer, such as a ball mill or get mill, or by a reduction process in which silver ions or a silver complex is reduced with a reducing agent, followed by aggregation. In some embodiments, silver particles may be produced by the reduction process from the viewpoint of easily controlling the particle size of the silver particles and forming a stable dispersion of silver particles.

Sphericity of Silver Particles

The sphericity of the silver particles is estimated according to the longer diameter and the shorter diameter of the silver particles obtained based on a projection observed under a scanning electron microscope (SEM) or a transmission electron microscope (TEM). More specifically, the sphericity of the silver particles is defined for convenience as the value calculated by (longer diameter+shorter diameter)/(2×shorter diameter). In some embodiments, the silver particles satisfy the following relationship (1):

$$1.0 \leq (\text{longer diameter} + \text{shorter diameter})/(2 \times \text{shorter diameter}) \leq 1.3 \quad (1)$$

Silver particles satisfying relationship (1) are close to a sphere. If metal particles having bumps and dips or protrusions are used, such uneven portions scatter light, and the amount of light reflected in a certain direction decreases. Consequently, printed imagery may not have a satisfactory gloss. Particularly in the case of using flaky aluminum particles as disclosed in Japanese Patent Laid-Open No. 2016-14141, the particles do not fuse, and the metallic coating have many gaps. In addition, since flaky aluminum particles are formed by pulverizing a vapor-deposited aluminum film, the aluminum particles tend to have sharp portions. The sharp portions scatter light incident thereon, reducing the amount of light reflected in a certain direction. Thus, printed imagery may not be satisfactorily glossy. In some embodiments, the silver particles are close to a sphere.

The longer diameter and the shorter diameter of silver particles may be measured by scanning electron microscopy (SEM) or transmission electron microscopy (TEM). For example, the longer diameter and the shorter diameter are measured by observing 100 of the silver particles. The longer diameter measurements of the 100 silver particles were averaged, and the resulting average value is determined to be the average longer diameter of all the silver particles. Similarly, the shorter diameter measurements of the 100 silver particles were averaged, and the resulting average value is determined to be the average shorter diameter of all the silver particles. These average longer diameter and shorter average diameter are the "longer diameter" and the "shorter diameter" in the above relationship (1).

Particle Size ($D_{50}$) at 50% in Cumulative Volume Distribution of Silver Particles The particle size at 50% in the cumulative distribution of silver particles ($D_{50}$ particle size) refers to the particle size of silver particles at a point in the cumulative particle size curve at which the cumulative volume calculated from the smallest particle in ascending order comes to 50% of the total volume of the particles subjected to measurement. In some embodiments, the $D_{50}$ particle size of the silver particles may be 10 nm or more to 150 nm or less. The $D_{50}$ particle size may be measured by dynamic light scattering.

Particle Size ($D_{90}$) at 90% in Cumulative Volume Distribution of Silver Particles The particle size at 90% in the cumulative distribution of silver particles ($D_{90}$ particle size) refers to the particle size of silver particles at a point in the cumulative particle size curve at which the cumulative volume calculated from the smallest particle in ascending order comes to 90% of the total volume of the particles subjected to measurement. In some embodiments, the $D_{90}$ particle size of the silver particles may be 200 nm or less. The larger the particle size of the silver particles, the more likely the silver particles will settle. In order to reduce the settling of silver particles, an index taking into account the particle size of large silver particles is used for evaluating the particle size of silver particles. Some embodiments focus on the $D_{90}$ particle size that is the diameter at a point at which the cumulative volume calculated from the smallest particle in ascending order comes to 90%. The silver particles having a particle size within 10% from the largest particle size diameter in the cumulative particle distribution are not taken into account because they are large but their frequency is low. By controlling the $D_{90}$ particle size of the silver particles to 200 nm or less, the silver particles become unlikely to settle, and the dispersion stability of the ink is increased. In addition, small silver particles are easier to fuse than large silver particles. By controlling the $D_{90}$ particle size to 200 nm or less, the silver coating is likely to have an even surface, increasing the gloss of the printed image. In some embodiments, $D_{90}$ may be 10 nm more. The $D_{90}$ particle size may be measured by dynamic light scattering.

Dispersion of Silver Particles

The silver particles may be a surfactant-dispersed type that can be dispersed with a surfactant as a dispersant or a resin-dispersed type that can be dispersed with a resin as a dispersant. The first ink may contain two or more types of silver particles in combination.

The surfactant used for the surfactant-dispersed type as a dispersant may be an anionic surfactant, a nonionic surfactant, a cationic surfactant, or an amphoteric surfactant. Examples of the anionic surfactant include fatty acid salts, alkyl sulfates, alkyl aryl sulfonates, alkyl diaryl ether disulfonic acid salts, dialkyl sulfosuccinates, alkyl phosphates, naphthalenesulfonic acid formalin condensate, polyoxyethylene alkyl ether sulfates, polyoxyethylene alkyl ether phosphates, and glycerol borate fatty acid esters. Examples of the nonionic surfactant include polyoxyethylene alkyl ethers, polyoxyethylene-oxypropylene block copolymers, sorbitan fatty acid esters, glycerin fatty acid esters, polyoxyethylene fatty acid esters, polyoxyethylene alkylamines, fluorine-containing compounds, and silicone compounds. Examples of the cationic surfactant include alkylamine salts, quaternary ammonium salts, alkylpyridinium salts, and alkylimidazolium salts. Examples of the amphoteric surfactant include alkylamine oxides and phosphatidylcholine.

One or more surfactants selected from the group consisting of anionic surfactants and nonionic surfactants may be used. In some of such embodiments, the anionic surfactant may be a polyoxyethylene alkyl ether sulfate, and the nonionic surfactant may be a polyoxyethylene alkyl ether.

In some embodiments using a resin-dispersed type, the molecule of the resin used as a dispersant (hereinafter referred to as the resin dispersant) may have a hydrophilic site and a hydrophobic site. Examples of the resin dispersant include polyvinyl resin, polyester resin, amino resin, acrylic resin, epoxy resin, urethane resin, polyether resin, polyamide resin, unsaturated polyester resin, phenol resin, silicone resin, and fluorine-containing polymer.

The polystyrene-equivalent weight average molecular weight (Mw), measured by gel permeation chromatography (GPC), of the resin dispersant may be 1,000 or more to 100,000 or less. In some embodiments, it may be 3,000 or more to 50,000 or less.

In the first ink, the ratio of the dispersant content (% by mass) to the silver particle content (% by mass) may be 1.0 or less. If the ratio of the dispersant exceeds 1.0, the dispersant may be excessive for the silver particles and may hinder the silver particles from coming close to each other and fusing. Thus, printed imagery may not be satisfactorily glossy.

When the dispersant is a surfactant, the ratio of the surfactant content to the silver particle content on a mass basis may be 0.02 or more. When the dispersant is a resin, the ratio of the resin dispersant content to the silver particle content on a mass basis may be 0.05 or more. If the ratio of the surfactant (dispersant) content to the silver particle content is less than 0.02, the dispersant is too little to facilitate the dispersion of the silver particles in the first ink. Consequently, the ink array not be stably ejected. Similarly, if the ratio of the resin dispersant content to the silver particle content is less than 0.05, the ink may not be stably ejected because of the same reason.

The silver particle content in the first ink may be 2.0% by mass or more to 15.0% by mass or less relative to the total mass of the first ink. If the silver particle content is less than 2.0% by mass, the silver particles do not easily come close to each other. Thus, the silver particles are not likely to fuse with each other, and, consequently, printed imagery may not be sufficiently glossy. If the silver particle content exceeds 15.0% by mass, the excessive silver particles increase the viscosity of the ink, and the ink may not be stably ejected. In some embodiments, the silver particle content in the first ink may be 2.0% by mass or more to 8.0% by mass or less relative to the total mass of the first ink.

Surfactant

The first ink may contain a further surfactant other than the surfactant used as a dispersant. This further surfactant may be an anionic surfactant, a nonionic surfactant, a cationic surfactant, or an amphoteric surfactant. In some embodiments, the further surfactant may be a nonionic surfactant. The nonionic surfactant may be an acetylene glycol ethylene oxide adduct. The nonionic surfactant may have an HLB (hydrophile-lipophile balance) value of 10 or more when measured by the Griffin method. Surfactants having an HLB value of less than 10 are hydrophobic and difficult to dissolve in the first ink. The HLB value obtained by the Griffin method is calculated from the equation: HLB value=20×(formula weight of the ethylene oxide group of surfactant); molecular weight of surfactant), using the formula weight of the ethylene oxide group of the surfactant and the molecular weight of the surfactant. An HLB value represents the degree of hydrophilicity or lipophilicity of a surfactant (compound) as a value in the range of 0 to 20. The lower the HLB value, the more lipophilic (hydrophobic) the compound. In contrast, the higher the HLB value, the more hydrophilic the compound.

The content of the surfactant used as a dispersant in the first ink may be 0.1% by mass or more to 3.0% by mass or less. The content of the surfactant other than the surfactant used as a dispersant in the first ink may be 0.1% by mass or more to 2.0% by mass or less.

Aqueous Medium

The first ink may contain water or an aqueous medium being a mixture of rater and a water-soluble organic solvent. The water may be deionized water (ion exchanged water). The water-soluble organic solvent may be selected from among, but is not limited to, solvents that can be used in ink jet inks, such as alcohols, glycols, glycol ethers, and nitrogen containing compounds. These water-soluble organic solvents may be used singly or in combination.

The water content in the first ink may be 50.0% by mass or more to 95.0% by mass or less relative to the total mass of the first ink. The water-soluble organic solvent content in the first ink may be 3.0% by mass or more to 50.0% by mass or less relative to the total mass of the first ink. If the water-soluble organic solvent content is less than 3.0% by mass, the first ink may be insufficient in reliability, for example, in resistance to solidification, when used in an ink jet printing apparatus. In contrast, if water-soluble organic solvent content is more than 50.0% by mass, the viscosity of the ink may increase to the extent that the ink cannot be stably ejected.

Other Constituents

The first ink may further contain a water-soluble organic compound that is solid at 25° C., such as urea or a urea derivative, trimethylolpropane, or trimethylolethane. Also, the first ink may optionally contain other additives, such as a pH adjuster, an antifoaming agent, a corrosion inhibitor, a preservative, an antifungal agent, an antioxidant, an antireductant, and a chelating agent.

Physical Properties of First Ink

The viscosity of the first ink at 25° C. may be 1 mPa·s or more to 5 mPa·s or less or 1 mPa·s or more to 3 mPa·s or less. The surface tension of the first ink at 25° C. may be 10 mN/m or more to 60 mN/m or less. In some embodiments, the surface tension may be 20 mN/m or more to 60 mN/m or less or 30 mN/m or more to 40 mN/m or less. The surface tension of the first ink may be appropriately set according to the type and content of the surfactant used in the first ink.

Second Ink

The second ink is an aqueous ink containing a dye. Constituents of the second ink will now be described.

Dye

Any anionic dye may be used without particular limitation, provided that the dye can be used as a coloring material in an ink jet ink. In some embodiments, the dye may be at least one selected from the group consisting of dyes having an azo skeleton, a phthalocyanine skeleton, an anthrapyridone skeleton, or a xanthene skeleton.

The dye content in the second ink may be 1.0% by mass or more to 10.0% by mass or less or 2.0% by mass or more to 8.0% by mass or less.

Aqueous Medium

The second ink inay contain water or an aqueous medium being a mixture of water and a water-soluble organic solvent. The water may be deionized water (ion exchanged water). The water-soluble organic solvent may be selected from among, but is not limited to, solvents that can be used in ink jet inks, such as alcohols, glycols, glycol ethers, and nitrogen-containing compounds. These water-soluble organic solvents may be used singly or in combination.

The water content in the second ink may be 50.0% by mass or more to 95.0% by mass or less relative to the total mass of the second ink. The water-soluble organic solvent content in the second ink may be 3.0% by mass or more to 50.0% by mass or less relative to the total mass of the second ink. If the water-soluble organic solvent content is less than 3.0% by mass, the second ink is likely to be insufficient in reliability, for example, in resistance to solidification, when used in an ink jet printing apparatus. In contrast, if water-soluble organic solvent content is more than 50.0% by mass, the ink may not be appropriately supplied.

Other Constituents

The second ink may further contain a water-soluble organic compound that is solid at room temperature (25° C.), such as urea or a urea derivative, trimethylolpropane, or trimethylolethane. Also, the second ink may optionally contain other additives, such as a surfactant, a resin, a pH adjuster, an antifoaming agent, a corrosion inhibitor, a preservative, an antifungal agent, an antioxidant, an antireductant, and a chelating agent.

Physical Properties of Second Ink

The viscosity of the second ink at 25° C. may be 1 mPa·s or more to 5 mPa·s or less or 1 mPa·s or more to 3 mPa·s or less. The surface tendon of the second ink at 25° C. may be 10 mN/m or more to 60 mN/m or less. In some embodiments, the surface tension may be 20 mN/m or more to 60 mN/m or less or 30 mN/m or more to 40 mN/m or less. The surface tension of the second ink may be appropriately set according to the type and content of the surfactant used in the second ink.

Printing Medium

The printing medium used in the present disclosure includes a transparent substrate and an ink-receiving layer disposed on one side of the transparent substrate. The transparent substrate and the ink-receiving layer of the printing medium will now be described.

Transparent Substrate

The transparent substrate used herein refers to a substrate capable of transmitting at least a portion of visible light. The phrase "transmitting light" implies that the amount of light that passes through the substrate is larger than the amount of light that is reflected from the substrate. For example, glass, which transmits almost all the visible rays, is colorless and transparent, while color glasses, which transmit only some of the visible rays, are transparent but colored. In some embodiments, the transparent substrate may be colorless and transparent.

The transparent substrate may be a glass plate, or a plastic film or plate made of, for example, polyester resin, such as polyethylene terephthalate or polyethylene naphthalate; acetate resin, such as diacetate or triacetate; polystyrene resin; polyolefin resin, such as polyethylene or polypropylene; polycarbonate resin; polymethacrylate resin, such as poly(methyl methacrylate); cellophane; celluloid; polyvinyl chloride resin; or polyimide resin. In some embodiments, the transparent substrate may be made of polyester resin, polyolefin resin, or polyvinyl chloride resin and, for example, may be a polyethylene terephthalate film, a polyethylene film, or a polyvinyl chloride film. The transparent substrate may be patterned or glossy, provided that it can transmit at least a portion of visible light. The thickness of the transparent substrate may be 1 µm or more to 5,000 µm or less. In some embodiments, the thickness may be 3 µm or more to 1,000 µm or less or 5 µm or more to 500 µm or less.

Ink-Receiving Layer

In some embodiments the ink-receiving layer is transparent to the extent that printed imagery is visible when printed imagery is observed from the side of the transparent substrate opposite the ink-receiving layer. The ink-receiving layer may be composed of a single layer or two or more layers. The material for forming the ink-receiving layer may be applied at a rate of 5.0 g/m$^2$ or more to 30.0 g/m$^2$ or less. The thickness of the ink-receiving layer may be 5.0 µm or more. In some embodiments, the thickness may be 5.2 µm or more or may be 5.5 µm or more. If the thickness of the ink-receiving layer is less than 5.5 µm, the ink absorbency of the ink-receiving layer may decrease to the extent that bleeding in printed imagery cannot be sufficiently reduced. Also, the thickness of the ink-receiving layer may be 30.0 µm or less.

The ink absorption of the ink-receiving layer may be 0.4 mL/m$^2$ or more. If the ink absorption of the ink-receiving layer is less than 0.4 mL/m$^2$, bleeding in printed imagery may not be sufficiently reduced. Also, the ink absorption of the ink-receiving layer may be 2.0 mL/m$^2$ or less.

The ink-receiving layer may have an average pore size of 40 nm or less. If the pore size of the ink-receiving layer exceeds 40 nm, silver particles are likely to be trapped therein, and, consequently, the gloss of printed imagery may be insufficient. In some embodiments, the average pore size of the ink-receiving layer may be 10 nm or more to 30 nm or less.

Inorganic Particles

In some embodiments, the ink-receiving layer may contain inorganic particles. The inorganic particles may have a primary particle size of 150 nm or less. For example, the primary particle size may be 1 nm or more to 100 nm or less or may be 3 nm or more to 30 nm or less. The primary particle size of the inorganic particles is defined as the number average of the diameters of imaginary circles having an area equivalent to the projected area of the primary inorganic particles observed under an electron microscope. For measuring the primary particle size, at least 100 particles are observed.

In some embodiments, the inorganic particles may be dispersed with a dispersant, and the dispersion is used in the coating liquid for forming the ink-receiving layer. The inorganic particles in the dispersion may have an average secondary particle size of 0.1 nm or more to 500 nm or less. For example, the average secondary particle size may be 1 nm or more to 300 nm or less or may be 10 nm or more to 250 nm or less. The average secondary particle size of the inorganic particles in the dispersion may be measured by dynamic light scattering.

The inorganic particle content in the ink-receiving layer may be 50.0% by mass or more to 98.0% by mass or less or may be 70.0% or more to 96.0% by mass or less relative to the total mass of the ink-receiving layer.

The amount of the inorganic particles applied when the ink-receiving layer is fainted may be 8 g/m$^2$ or more to 45 g/m$^2$ or less. By applying inorganic particles at such a rate, the ink-receiving layer can be easily formed to an appropriate thickness.

The inorganic particles may be hydrated alumina, alumina, silica, colloidal silica, or titanium dioxide. These types of inorganic particles may be used singly or in combination. In particular, hydrated alumina, alumina, and silica enable the formation of an ink-absorbing porous structure therefore beneficial.

The hydrated alumina may be amorphous or in the form of boehmite. The alumina may be fumed alumina. The fumed alumina may be γ-alumina, α-alumina, δ-alumina, θ-alumina, or χ-alumina. From the viewpoint of the optical density of printed imagery and the ink absorbency of the ink-receiving layer, γ-alumina may be used.

Hydrated alumina and alumina may be dispersed in water with a dispersant, and the dispersion liquid of these alumina may be mixed into the coating liquid for forming the ink-receiving layer. In this instance, the dispersant may be an acid. The acid dispersant may be a compound represented by R—SO$_3$H. Such a compound has an effect of reducing bleeding in imagery. In this formula, R represents hydrogen, an alkyl group having a carbon number of 1 to 4, or an alkenyl group having a carbon number of 1 to 4, and any hydrogen of R may be substituted by an oxo group, a halogen atom, an alkoxy group, or an acyl group.

The proportion of the acid content to the total content of the hydrated alumina and alumina may be 1.0% by mass or more to 2.0% by mass or ss or 1.3% by mass or more to 1.6% by mass or less.

The silica that can be used in the ink-receiving layer is roughly classified into two types: wet process silica and dry process silica (fumed silica) by the production process. In a known wet process, hydrous silica is produced by decomposing a silicate into active silica with an acid and polymerizing the active silica to an appropriate extent, followed by precipitation and aggregation. In a known dry process, anhydrous silica is produced by high temperature gas phase hydrolysis (flame hydrolysis) of a silicon halide or a process (arc process) in which silica sand and coke are heated, reduced, and evaporated by arc in an electrical furnace and the evaporated gas phase is oxidized with air. In some embodiments, dry process (fumed silica) may be used. Fumed silica particles have a particularly large specific area and, accordingly, exhibit high ink absorbency. In addition, finned silica has a low refractive index and, accordingly, can impart transparency to the ink-receiving layer.

Hydrated alumina, alumina, and silica may be combined. For example, at least two of hydrated alumina powder, alumina powder, and silica powder may be mixed with each other and then dispersed in a liquid. In some embodiments, hydrated alumina and fumed alumina may be used in combination as the inorganic particles.

Binder

In some embodiments, the ink-receiving layer may contain a binder. The term binder used herein refers to a material that can bind inorganic particles together and thus help the formation of a film.

In the ink-receiving layer, the mass ratio of the binder to the inorganic particles may be 0.50 or less. If the mass ratio of the binder exceeds 0.50, the binder is excessive for the inorganic particles and may reduce ink absorbency to the extent that bleeding in printed imagery cannot be sufficiently reduced. In some embodiments, the mass ratio of the binder to the inorganic particles may be 0.30 or less. Also, the mass ratio of the binder may be 0.05 or more, for example, 0.08 or more, from the viewpoint of binding the components of the ink-receiving layer.

Examples of the binder include starch derivatives, such as oxidized starch, etherified starch, and phosphoric acid-esterified starch; cellulose derivatives, such as carboxymethyl cellulose and hydroxyethyl cellulose; casein, gelatin, soy protein, polyvinyl alcohol, and derivatives thereof; conjugated polymer latexes, such as polyvinyl pyrrolidone, maleic anhydride polymer, styrene-butadiene copolymer, and methyl methacrylate-butadiene copolymer; acrylic polymer latexes, such as polymers of acrylic esters or methacrylic esters; vinyl polymer latexes, such as ethylene-vinyl acetate copolymer; products of cationization of the above-mentioned polymers with a cationic group; products of cationization at the surface of any of the above-cited polymers with a cationic surfactant; polymers of polymerization of any monomer of the above-cited polymers in the presence of a cationic polyvinyl alcohol, having surfaces to which the polyvinyl alcohol is adsorbed; polymers of polymerization of any monomer of the above-cited polymers in a cationic colloid particles-suspended dispersion, having surfaces to which cationic colloid particles are adsorbed; aqueous binders, such as melamine resin, urea resin, and other thermosetting synthesized resins; polymers and copolymers of methacrylic esters and/or acrylic esters, such as polymethyl methacrylate; and other synthetic resins. These binders may be used singly or in combination.

In some embodiments, polyvinyl alcohol or derivatives thereof may be used as the binder. Exemplary polyvinyl alcohol derivatives include cation-modified polyvinyl alcohols, anion-modified polyvinyl alcohols, silanol-modified polyvinyl alcohols, and polyvinyl acetal.

For preparing a coating liquid for forming the ink-receiving layer, an aqueous solution of polyvinyl alcohol or a polyvinyl alcohol derivative may be used. In this instance, the solid contents of the polyvinyl alcohol or the polyvinyl alcohol derivative may be 3.0% by mass or more to 20.0% by mass or less relative to the total mass of the coating liquid for forming the ink-receiving layer.

Crosslinking Agent

The ink-receiving layer may further contain a crosslinking agent. Examples of the crosslinking agent include zirconium-based compounds, amide-based compounds, aluminum-based compounds, and boric acid and salts thereof. These crosslinking agents may be used singly or in combination. In particular, if polyvinyl alcohol or a derivative thereof is used as the binder, boric acid or a salt thereof may be beneficial as the crosslinking agent.

Boric acid may be orthoboric acid ($H_2BO_3$), metaboric acid, and hypoboric acid. The boric acid salt may be a water-soluble salt of any of these boric acids. Examples of the boric acid salt include alkali metal salts, such as sodium borate and potassium borate; alkaline-earth metal salts, such as magnesium borate and calcium borate; and ammonium salts. Among these compounds, orthoboric acid is beneficial in terms of the stability of the coating liquid with time and the effect of reducing cracks.

The amount of the crosslinking agent to be used can be appropriately controlled according to the manufacturing conditions or the like. The proportion of the crosslinking agent in the ink-receiving layer to the binder may be 1.0% by mass or more to 50.0% by mass or less or may be 5.0% by mass or more to 40.0% by mass or less.

If polyvinyl alcohol is used as the binder and at least one selected from the group consisting of boric acids and boric acid salts is used as the crosslinking agent, the total content of the crosslinking agent in the ink-receiving layer may be 5.0% by mass or more to 30.0% by mass or less relative to the binder content.

Other Constituents

The ink-receiving layer may further contain other constituents as additives. Examples of such additives include a pH adjuster, a thickener, a releasing agent, a fluorescent brightening agent, an ultraviolet absorbent, an antioxidant, a preservative, a fungicide, a water-resistant additive, and a curing agent.

The haze value of the printing medium may be 60% or less and is beneficially 30% or less in some embodiments. The haze value is calculated by $(T_d/T_t) \times 100$, wherein $T_t$ represents total luminous transmittance that is the transmittance of all the light rays that pass through a printing medium, and $T_d$ represents diffuse luminous transmittance that is the transmittance of diffuse light rays that pass through the printing medium. As the haze value comes closer to 0%, the diffuse luminous light transmittance decreases; hence, the transparency of the printing medium increases. The haze may be measured with a haze meter in accordance with JIS K 7105 and JIS K 7136.

Process for Manufacturing Printing Medium

The printing medium may be produced by preparing a coating liquid for the ink-receiving layer and applying the coating liquid onto a transparent substrate. The process for producing the printing medium will now be described.

For example, the ink-receiving layer may be formed on a transparent substrate according to the following procedure. First, a coating liquid for the ink-receiving layer is prepared. The coating liquid is then applied onto a transparent substrate, followed by drying. Thus, the printing medium is completed. The application of the coating liquid may be performed using a coater, such as a curtain coater, an extrusion coater, or a coater using a slide hopper method. The coating liquid may be heated while being applied. For drying the applied coating liquid, a dryer may be used, and examples of the dryer include hot air dryers, such as a linear tunnel dryer, an arch dryer, an air loop dryer, and a sine curve air flow dryer; an IR dryer; a heating dryer; and a microwave dryer.

EXAMPLES

The subject matter of the present disclosure will be further described in detail with reference to the following Examples and Comparative Examples. However, it is not limited to the Examples. In the following description, "part(s)" and "%" are on a mass basis unless otherwise specified.

Preparation of Inorganic Particle Dispersion Liquids

Inorganic Particle Dispersion Liquid 1

Into 160.0 g of pure water were added 40.0 g of hydrated alumina powder (DISPERAL HP14, produced by Sasol) and 0.6 g of methanesulfonic acid. These materials were stirred in a mixer for 30 minutes to yield inorganic particle dispersion liquid 1 containing 20.0% of hydrated alumina inorganic particles.

Inorganic Particle Dispersion Liquid 2

Inorganic particle dispersion liquid 2 was prepared in the same manner as inorganic particle dispersion liquid 1 except that the inorganic particles were replaced with hydrated alumina powder (DISPERAL HP22, produced by Sasol).

Inorganic Particle Dispersion Liquid 3

Inorganic particle dispersion liquid 3 was prepared in the same inorganic particle dispersion liquid 1 except that the inorganic particles were replaced with hydrated alumina powder (DISPERAL HP30, produced by Sasol).

Inorganic Particle Dispersion Liquid 4

Into 160.0 g of pure water were added 40.0 g of finned silica powder (AEROSIL 50, produced by EVONIK) and 2.0 g of SHALLOL DC-902 (produced by Dai-ichi Kogyo Seiyaku). These materials were stirred in a mixer for 30 minutes to yield inorganic particle dispersion liquid 4 containing 20.0% of silica inorganic particles.

Preparation of Coating Liquids

Polyvinyl alcohol (PVA 235, produced by Kuraray, polymerization degree: 3500, saponification degree: 88%) was dissolved as the binder in ion-exchanged water to yield a polyvinyl alcohol aqueous solution containing 8.0% of solids. The polyvinyl alcohol aqueous solution was mixed with each of the inorganic particle dispersion liquids shown in Table 1 so that the proportion ((binder)/(inorganic particles)) of the solids in the polyvinyl alcohol solution to the solids in the inorganic particle dispersion liquid would be the value shown in Table 1. The resulting mixture was mixed with 3.0% boric acid aqueous solution so that the boric acid solids would be 1.0% relative to the inorganic particle solids. Each coating liquid was thus prepared.

TABLE 1

| | Coating liquid | | | | | |
|---|---|---|---|---|---|---|
| | Coating liquid No. | | | | | |
| | 1 | 2 | 3 | 4 | 5 | 6 |
| Inorganic particle dispersion liquid No. | 1 | 2 | 3 | 4 | 1 | 1 |
| (Binder)/(Inorganic particles) | 0.10 | 0.10 | 0.10 | 0.20 | 0.50 | 0.60 |

Preparation of Printing Media

Each coating liquid was applied onto a 100 μm-thick transparent substrate shown in Table 2 so that the weight (g/m$^2$) of the coating after drying could be the value shown in Table 2. The coating was then dried with hot air of 90° C. to yield a printing medium. Table 2 shows the haze value, the average pore size of the ink-receiving layer, the ink absorption of the ink-receiving layer, and the thickness of the ink-receiving layer together. These properties were each measured in a manner as described herein later. In Table 2, PET represents polyethylene terephthalate, PE represents polyethylene, and PVC represents polyvinyl chloride.

TABLE 2

| Preparation and Properties of Printing Media | | | | | | | | | | | | |
|---|---|---|---|---|---|---|---|---|---|---|---|---|
| | Printing medium No. | | | | | | | | | | | |
| | 1 | 2 | 3 | 4 | 5 | 6 | 7 | 8 | 9 | 10 | 11 | 12 |
| Substrate material | PET | PE | PVC | PET | PET | PET | PET | PET | PET | PET | PET | PET |
| Coating liquid No. | 1 | 1 | 1 | 2 | 3 | 4 | 1 | 1 | 1 | 5 | 6 | 1 |
| Weight of coating after drying (g/m$^2$) | 20.0 | 20.0 | 20.0 | 20.0 | 20.0 | 20.0 | 5.5 | 5.2 | 5.0 | 20.0 | 20.0 | 20.0 |
| Haze (%) | 7 | 7 | 7 | 30 | 84 | 99 | 4 | 4 | 3 | 7 | 7 | 30 |
| Average pore size (nm) of ink-receiving layer | 21 | 21 | 21 | 36 | 48 | 98 | 21 | 21 | 21 | 21 | 21 | 32 |
| Ink absorption (mL/m$^2$) of ink-receiving layer | 1.7 | 1.7 | 1.7 | 1.9 | 1.5 | 3.3 | 0.4 | 0.3 | 1.7 | 1.7 | 1.7 | 1.9 |
| Thickness (μm) of ink-receiving layer | 20.0 | 20.0 | 20.0 | 20.0 | 20.0 | 20.0 | 5.5 | 5.2 | 5.0 | 20.0 | 20.0 | 20.0 |

Measurement of Haze

The haze of the printing media was determined in accordance with JIS K 7105 and JIS K 7136 with a haze meter NDH 4000 (manufactured by Nippon Denshoku Industries).

Measurement of Average Pore size

The pore size of the ink-receiving layer was measured with a pore size distribution analyzer using gas permeation (POROMETER 3 Gz, manufactured by Quantachrome Instruments). The pore sizes of randomly selected 100 pores were measured, and the average of the 100 pore sizes was determined as the average pore size of the ink-receiving layer.

Measurement of Ink Absorption

There is known Bristow's Method specified in Standard No. 51 of JAPAN TAPPI, "Test Method for Liquid Absorption of Paper and Paperboard" (in Japanese) as a method for measuring the ink absorbency of printing media. Ink absorption was measured by Bristow's method.

A predetermined amount of an ink (solvent) was introduced into a container having a slit having predetermined dimensions and was brought into contact with a printing medium cut into a rectangular shape and wound around a disk through the slit. Then, the disk was rotated with the container fixed so that the ink being transferred to the printing medium could form a band, and the area (length) of the ink band was measured. The rate (mL/m=') of ink transferred to the printing medium per unit area was calculated from the area of the ink band. The obtained rate (mL/m$^2$) represents the volume of the ink absorbed into the printing medium for a predetermined period. The predetermined period here is defined as the transfer period for which the ink was transferred. The transfer period (m$^{1/2}$) corresponds to the period for which the slit and the printing medium are in contact with each other and is calculated from the rotational speed of the disk and the width of the slit. In the present disclosure, the ink absorption of a printing medium represents the ink absorption for a transfer period of 10 ms$^{1/2}$.

Preparation of Silver Particle Dispersion Liquids

Silver particle dispersion liquids 1 to 3 (containing 20.0% of silver particles and 2.0% of a resin) were prepared according to the preparation method described in Example 2 disclosed in International Publication No. WO 008/049519. The $D_{50}$ particle size was varied by varying the stirring speed for the preparation. Furthermore, silver particle dispersion liquid 4 (containing 20.0% of silver particles and 2.0% of a surfactant) was prepared according to the preparation method described in Example 2-2 disclosed in Japanese Patent Laid-Open No. 2004-285106. The $D_{50}$ particle size of silver particles for each dispersion liquid was determined by dynamic light scattering and is shown in Table 3.

Preparation of Aluminum Particle Dispersion Liquids

Aluminum particle dispersion liquids 1 and 2 (each containing 20.0% of aluminum particles) were prepared according to the metallic pigment dispersion liquid reparation method described in the Examples disclosed in Japanese Patent Laid-Open No. 2010-18651. The $D_{50}$ particle size was varied by varying dispersing conditions. The $D_{50}$ particle size of aluminum particles was determined by dynamic light scattering and is shown in Table 3.

$D_{50}$ Measurement

The $D_{50}$ values of the silver particles and the aluminum particles were measured with a dynamic light scattering particle size distribution analyzer (Nanotrac UPA-EX150, manufactured by Nikkiso) under the conditions, SetZero: 30 s, number of measurement times: 3, measuring period: 180 s, shape: perfect sphere, and refractive index: 1.6.

TABLE 3

| Dispersion liquids | $D_{50}$ (nm) |
|---|---|
| Silver particle dispersion liquid 1 | 32 |
| Silver particle dispersion liquid 2 | 111 |
| Silver particle dispersion liquid 3 | 150 |
| Silver particle dispersion liquid 4 | 32 |
| Aluminum particle dispersion liquid 1 | 1100 |
| Aluminum particle dispersion liquid 2 | 32 | surfactant produced by Kawaken Fine Chemical. The HLB value of Acetylenol E100 determined by the Griffin method is 13, Compound 1 was C.I. Acid blue 9, as shown below.

TABLE 4

First Ink Composition

| | First ink No. | | | | | | |
|---|---|---|---|---|---|---|---|
| | 1 | 2 | 3 | 4 | 5 | 6 | 7 |
| Silver particle dispersion 1 | 50.0 | | | | 50.0 | | |
| Silver particle dispersion 2 | | | | 50.0 | | | |
| Silver particle dispersion 3 | | | 50.0 | | | | |
| Silver particle dispersion 4 | | 50.0 | | | | | |
| Aluminum particle dispersion 1 | | | | | | | 50.0 |
| Aluminum particle dispersion 2 | | | | | | 50.0 | |
| Compound 1 | | | | | 5.0 | | |
| Ethylene glycol | 20.0 | 20.0 | 20.0 | 20.0 | 20.0 | 20.0 | 20.0 |
| Acetylenol E100 | 0.2 | 0.2 | 0.2 | 0.2 | 0.2 | 0.2 | 0.2 |
| Ion-exchanged water | 29.8 | 29.8 | 29.8 | 29.8 | 24.8 | 29.8 | 29.8 |

Preparation of Second Inks

Preparation of Dye

The following compounds were prepared, wherein although the structural formula shown below is compound 3 in the form of a free acid, compound 3 actually used was the potassium salt:

Compound 1: C.I. Acid Blue 9

Compound 2: C.I. Acid Red 249

Compound 3: Compound represented by the following formula (2), synthesized according to the procedure disclosed in Japanese Patent Laid-Open No. 2016-108545:

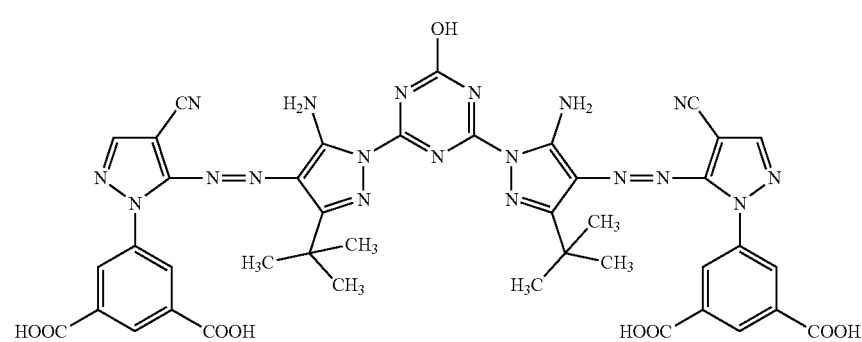

(2)

Preparation of First Inks

The constituents shown in Table 4 were mixed. After being sufficiently stirred, the mixture was subjected to pressure filtration through a filter having a pore size of 1.2 μm to yield a first ink. Acetylenol E100 is a nonionic Preparation of Pigment Dispersion Liquid A styrene-acrylic acid copolymer (resin dispersant) having an acid value of 150 mg KOH/g and a weight average molecular weight of 8,000 was prepared. This copolymer (20.0 parts) was neutralized with an amount of potassium hydroxide equivalent to the acid value of the copolymer, and an appropriate amount of pure water was added to yield a resin dispersant aqueous solution containing 20.0% of resin (solids). Subsequently, 20.0 parts of a pigment (Monarch 1100 produced by Cabot), 10.0 parts of a resin dispersant aqueous solution, and 75.0 parts of pure water were mixed. The resulting mixture and 200 parts of zirconia beads of 0.3 mm in diameter were placed into a batch-type vertical sand mill (manufacture by Aimex) and agitated for 5 hours while being cooled with water. Then, after coarse particles were removed by centrifugation, the mixture was subjected to pressure filtration through a cellulose acetate filter having a pore size of 3.0 μm (manufactured by Advantec) to yield a pigment dispersion liquid containing 20.0% of pigment and 2.0% of a resin dispersant.

Second Ink

The constituents shown in Table 5 were mixed. After being sufficiently stirred, the mixture was subjected to pressure filtration through a filter having a pore size of 1.2 μm to yield a second ink Acetylenol E100 is a nonionic surfactant produced by Kawaken Fine Chemical.

TABLE 5

Second Ink Composition

| | Second ink No. | | | |
|---|---|---|---|---|
| | 1 | 2 | 3 | 4 |
| Compound 1 | 5.0 | | | |
| Compound 2 | | 5.0 | | |
| Compound 3 | | | 5.0 | |
| Pigment dispersion liquid | | | | 25.0 |
| Glycerin | 15.0 | 15.0 | 15.0 | 15.0 |
| Ethylene glycol | 10.0 | 10.0 | 10.0 | 10.0 |
| Acetylenol E100 | 0.5 | 0.5 | 0.5 | 0.5 |
| Ion-exchanged water | 69.5 | 69.5 | 69.5 | 49.5 |

Treatment Agent

A treatment agent was prepared which contains 15 parts of fumed silica powder (CAB-O-SPERSE PG002, produced by Cabot), 5 parts of urethane resin (UCUAT UWS-145, produced by Sanyo Chemical Industries), and 80 parts of ion-exchanged water.

Examination

An ink cartridge was charged with each set of a first ink and a second ink combined as shown in Table 6 and was mounted in an ink jet printing apparatus (PIXUS MG3630, manufactured by Canon) having a print head from which the inks are ejected by thermal energy. In the Examples, when an image is printed with the first ink and the second ink under the conditions where one ink droplet with a volume of about 11.2 pL was applied to a unit region of 1/1200 inch×1/1200 inch, the printing duty of the resulting image is defined as 100%. In Examples 1 to 7 and 9 to 19 and Comparative Examples 1 to 5, 7, and 8, the second ink was applied onto the printing medium shown in Table 6 at a printing duty of 100% with the ink jet printing apparatus. Then, the first ink was applied at a printing duty of 100% so as to cover at least a portion of the region coated with the second ink. In Example 8 and Comparative Example 6, the first ink was applied onto the printing medium shown in Table 6 at a printing duty of 100% with the ink jet printing apparatus. Then, the second ink was applied at a printing duty of 100% so as to cover at least a portion of the region coated with the first ink. In Reference Example 1, after the treatment agent was applied onto the printing medium with a roller, the second ink was applied at a printing duty of 100%. The treatment agent was applied onto the printing medium at a rate of 1 g/m². Then, the first ink was applied at a printing duty of 100% so as to cover at least a portion of the region coated with the second ink. The glossy paper used as the printing medium in Comparative Example 1 was Canon Photo Paper (Gloss Pro Platinum Grade, manufactured by Canon). For evaluation, A and B represent acceptable levels, and C represents unacceptable level. The evaluation results are shown in Table 6.

Gloss of Image

The definition (=L/w) of each printed image was measured with a gonio-spectrophotometer GSP-2 (manufactured by Murakami Color Research Laboratory), wherein L represents the highest of the lightness values measured with the photoreceptor of the gonio-spectrophotometer, and w represents the width of acceptance angles at 2 points at which the lightness is one-half of L (L/2). When the definition is 0.2 or more, the lightness of visually observed images varies depending on the angle of observation. Such images are considered to be glossy.

A: Definition was 4.0 or more.
B: Definition was 3.0 or more to less than 4.0.
C: Definition was less than 3.0.

Coloration of Images

The color of each image was measured with an integrating sphere spectrocolorimeter CM-2600d (manufactured by Konica Minolta) in the specular component included (SCI) mode as described below. $a_0^*$ and $b_0^*$ were measured for an image printed at a printing duty of 100% only with a first ink containing silver particles, and $a_1^*$ and $b_1^*$ were measured for an image printed with an ink containing silver particles and an ink containing a dye each at a printing duty of 100%. The color difference $\Delta E_{ab}$ was calculated by substituting the measured values into the equation: color difference $\Delta E_{ab} = \{(a_1^* - a_0^*)^2 + (b_1^* - b_0^*)^2\}^{1/2}$. a* and b* are each a value specified in the CIE (International Commission on Illumination) L*a*b* color system. When $\Delta E_{ab}$ is 2.0 or more, the image looks like a color derived from the dye used but not silver. When $\Delta E_{ab}$ is high, the image looks like a color satisfactorily derived from the dye used.

A: $\Delta E_{ab}$ was 6.0 or more.
B: $\Delta E_{ab}$ was 2.0 or more to less than 6.0.
C: $\Delta E_{ab}$ was less than 2.0.

Bleeding in Images

A region to which both the first ink and the second ink had been applied was visually Observed.
A: No bleeding was observed.
B: Bleeding was observed.

TABLE 6

Examination results

| | Combination | | | Evaluation | | |
|---|---|---|---|---|---|---|
| | Printing medium | First ink | Second ink | Gloss | Coloration | Bleeding |
| Example 1 | 1 | 1 | 1 | A | A | A |
| Example 2 | 2 | 1 | 1 | A | A | A |
| Example 3 | 3 | 1 | 1 | A | A | A |
| Example 4 | 1 | 2 | 1 | A | A | A |
| Example 5 | 1 | 1 | 2 | A | A | A |
| Example 6 | 1 | 1 | 3 | A | A | A |
| Example 7 | 1 | 3 | 1 | A | A | A |
| Example 8 | 1 | 1 | 1 | A | A | A |
| Example 9 | 4 | 4 | 1 | A | A | A |
| Example 10 | 5 | 4 | 1 | B | B | A |
| Example 11 | 6 | 4 | 1 | B | B | A |
| Example 12 | 1 | 1 | 1 | A | A | A |

TABLE 6-continued

Examination results

| | Combination | | | Evaluation | | |
|---|---|---|---|---|---|---|
| | Printing medium | First ink | Second ink | Gloss | Coloration | Bleeding |
| Example 13 | 1 | 1 | 1 | A | A | A |
| Example 14 | 1 | 1 | 1 | B | A | A |
| Example 15 | 7 | 1 | 1 | A | A | A |
| Example 16 | 8 | 1 | 1 | A | A | B |
| Example 17 | 9 | 1 | 1 | A | A | B |
| Example 18 | 10 | 1 | 1 | A | A | A |
| Example 19 | 11 | 1 | 1 | A | A | B |
| Comparative Example 1 | Glossy paper | 1 | 1 | C | C | A |
| Comparative Example 2 | 1 | 5 | — | C | A | A |
| Comparative Example 3 | 1 | 6 | 1 | C | A | A |
| Comparative Example 4 | 1 | 7 | 1 | C | A | A |
| Comparative Example 5 | 1 | 1 | 4 | C | A | A |
| Comparative Example 6 | 1 | 1 | 4 | A | C | A |
| Comparative Example 7 | 4 | 1 | 1 | C | A | A |
| Comparative Example 8 | 12 | 1 | 1 | C | A | A |
| Reference Example 1 | 1 | 1 | 1 | A | A | C |

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-210532 filed on Oct. 31, 2017 and No. 2018-173268 filed on Sep. 18, 2018, which are hereby incorporated by reference herein in their entirety.

What is claimed is:

1. An ink jet printing method comprising:
printing an image on a printing medium including a transparent substrate and an ink-receiving layer on one side of the transparent substrate by applying a first ink and a second ink onto the surface of the ink-receiving layer in such a manner that the first ink and the second ink are at least partially superposed one on the other, the first ink being an aqueous ink comprising silver particles, the second ink being an aqueous ink comprising a dye,
wherein a particle size at 50% in a cumulative volume distribution of the silver particles is larger than an average pore size of the ink-receiving layer.

2. The ink jet printing method according to claim 1, wherein the ink-receiving layer absorbs ink at a volume of 0.4 mL/m² or more.

3. The ink jet printing method according to claim 1, wherein the average pore size of the ink-receiving layer is 40 nm or less.

4. The ink jet printing method according to claim 1, wherein the ink-receiving layer has a thickness of 5.5 µm or more.

5. The ink jet printing method according to claim 1, wherein the ink-receiving layer comprises a binder and inorganic particles, and the proportion of the mass of the binder to the mass of the inorganic particles is 0.50 or less.

6. The ink jet printing method according to claim 1, wherein the dye contained in the second ink is present in the ink-receiving layer.

7. The ink jet printing method according to claim 1, wherein the first ink is applied to the printing medium after the application of the second ink.

8. The ink jet printing method according to claim 1, wherein the image is viewed from an opposite side of the printing medium on which the ink-receiving layer is disposed.

9. The ink jet printing method according to claim 1, wherein the transparent substrate is made of a polyester resin, a polyolefin resin, or a polyvinyl chloride resin.

10. The ink jet printing method according to claim 1, wherein a thickness of the transparent substrate is 1 µm or more to 5,000 µm or less.

11. The ink jet printing method according to claim 1, wherein the ink-receiving layer absorbs ink at a volume of 2.0 mL/m² or less.

12. The ink jet printing method according to claim 1, wherein an average pore size of the ink-receiving layer is 10 nm or more to 30 nm or less.

13. The ink jet printing method according to claim 1, wherein the ink-receiving layer has a thickness of 30.0 µm or less.

14. The ink jet printing method according to claim 5, wherein a proportion of the mass of the binder to the mass of the inorganic particles is 0.05 or more.

15. The ink jet printing method according to claim 1, wherein a haze value of the printing medium is 60% or less.

16. The ink jet printing method according to claim 1, wherein a haze value of the printing medium is 30% or less.

17. The ink jet printing method according to claim 1, wherein a content of the silver particles in the first ink is 2.0% by mass or more to 15.0% by mass or less relative to the total mass of the first ink.

18. The ink jet printing method according to claim 1, wherein the particle size at 50% in a cumulative volume distribution of the silver particles is 10 nm or more to 150 nm or less.

19. The ink jet printing method according to claim 1, wherein a particle size at 90% in the cumulative distribution of silver particles is 10 nm or more to 200 nm or less.

20. The ink jet printing method according to claim 1, wherein a content of the dye in the second ink is 1.0% by mass or more to 10.0% by mass or less relative to the total mass of the first ink.

* * * * *